March 2, 1937.　　　J. B. CURTIS　　　2,072,581
CUTLERY
Filed Nov. 14, 1934
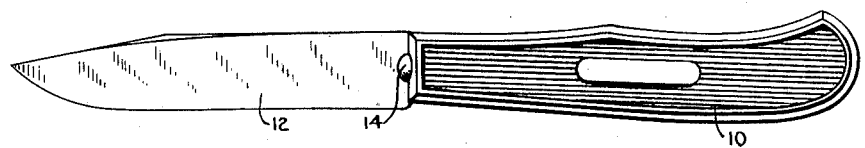
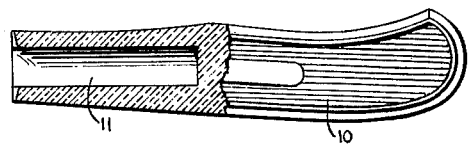
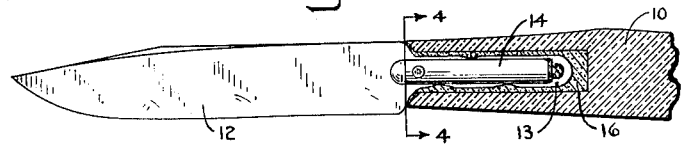
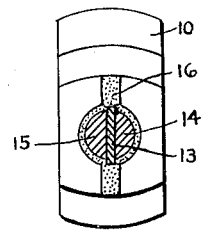
INVENTOR.
JOHN B. CURTIS
BY
ATTORNEY Patented Mar. 2, 1937

2,072,581

UNITED STATES PATENT OFFICE 2,072,581

CUTLERY

John B. Curtis, Bridgeport, Conn., assignor to Remington Arms Company, Inc., a corporation of Delaware Application November 14, 1934, Serial No. 753,013

4 Claims. (Cl. 30—9)

This invention relates to cutlery, and particularly to means for the joining of a metallic blade to a handle of one of the class of materials commonly referred to as "plastics".

In recent years, plastic materials, particularly condensation and polymerization plastics, have to a certain extent been used as the handles of cutlery articles, such as kitchen and table knives and forks. The most common plastics thus used are the phenolic condensation products, of which bakelite is typical. These plastics in masses of proper proportion cured under rather accurately controlled temperatures and conditions of heat exchange have the properties necessary for efficient cutlery handles. Their use of this purpose, however, has been seriously hampered by the difficulty of properly joining them to blades and blade tangs. Prior efforts in this direction have been along the lines of forming the blade or other metallic implement with a tang which was molded into the handle, that is, the tang was inserted in the plastic mass of uncured handle material and the material pressed firmly around the tang. The handle material was then cured in the usual manner. Such handles have never been entirely successful, being irregularly and unaccountably brittle. Efforts to overcome this defect have included extending the surface of contact of the tang with the handle material by providing the tang with enlarged reinforcements having irregular surfaces. Efforts have also been made to secure a more intimate bonding of the tang and handle material by providing the tang itself or metallic members secured thereto with recesses and apertures to be filled by the handle material. Notwithstanding these and other similar devices intended to prevent the breakage of bakelite handles and enable the utilization of the desirable properties of bakelite for this purpose, bakelite handles of the past have been notoriously fragile, and the difficulty has been aggravated by wide variations in the brittleness of different handles made under apparently identical conditions.

The present invention comprises the discovery that weakness and brittleness of bakelite, particularly in the form of molded handles of cutlery articles, is largely due to efforts to simultaneously cure comparatively large masses and relatively thin sections bounded by heat conducting metal. A cutlery handle having an inserted tang invariably comprises sections of handle material of varying thickness, and the blade tang is a heat conducting body. Undesirable weakness of the thinner sections of the handle inevitably results from curing under such conditions as are required for the heavier masses.

The present invention contemplates the forming and curing of a bakelite handle having a tang receiving recess but completing the curing in the absence of a blade or tang. The invention likewise contemplates the subsequent securing of a tang in said recess by a novel and singularly effective securing means.

In the drawing:

Fig. 1 is a side elevation of one form of completed knife having blade and handle joined according to the methods of this invention.

Fig. 2 is a side elevation, partly in section, of a finished handle.

Fig. 3 is a fragmentary side elevation, partly in section, of the knife shown in Fig. 1.

Fig. 4 is a transverse section on the line 4—4 of Fig. 3.

The handle 10 is of bakelite or other condensation or polymerization plastic and is formed with a recess 11, preferably of generally circular cross-section and of a diameter somewhat greater than the diameter of the tang to be inserted therein. The blade 12 comprises a tang 13 which preferably has fixed thereto generally semi-cylindrical reinforcing members 14 and 15. The ends of these reinforcing members adjacent the blade, which are rounded and smoothed, are arranged to project from the handle a short distance along the blade surfaces, as shown in Fig. 1; thus, preventing a concentration of stresses in the blade adjacent the end of the handle. The tang of such blade is adapted to be inserted in the handle recess 11 and secured therein by filling the cavity about the tang with a medium 16 which forms an important element of the present invention. The securing mediums of the prior art have invariably been compositions including sulphur, resin or litharge, usually applied in a heated and molten condition and invariably setting upon cooling to rigid, brittle, crystalline masses, which are quite as rigid as the handle material itself.

Cutlery articles are inevitably subjected to substantial and abrupt changes of temperature. The metal tang has a much higher thermal coefficient of expansion than the handle; thus, if handle and tang are rigidly joined, large stresses are induced in the handle, with frequent breakage. The difficulty is augmented by the fact that bakelite and other phenolic condensation products tend to become more brittle at higher temperatures.

The present invention departs completely from prior practice with respect to blade and handle joining materials. For this purpose a thermo-plastic cement is used. Such a cement, while substantially rigid at ordinary temperatures, gradually softens with a rise in temperature. Thus, while the blade tang is being expanded by temperature elevation, the cement becomes proportionately yielding and pliable, and no appreciable stress is transmitted to the handle. The cement is preferably of such character that, while softening, it does not become too fluid at the highest temperatures to which cutlery articles are ordinarily subjected. A very desirable cement comprises a mixture of resins, with or without a filler. It has been found entirely feasible to select a cement which will soften enough to prevent handle breakage at temperatures to which cutlery articles are ordinarily exposed and yet remain sufficiently firm to prevent undesirable displacement of the blade with respect to the handle.

The use of a thermo-plastic cement as a blade and handle joining medium is believed to be broadly new, and its advantages are extraordinary. For the first time, it is possible to utilize the desirable properties of bakelite and other condensation and polymerization plastics in the production of actually rugged and dependable cutlery. The appended claims are therefore to be broadly construed. In said claims, the term "plastic" or "plastic material" is used in the ordinary sense, defining a material such as bakelite or other condensation or polymerization product which is formed in a plastic state but sets to a body which is permanently rigid under ordinary conditions of use; and the term "thermo-plastic" indicates a substance which is somewhat softened by an elevation of temperature which may take place under conditions of use.

What is claimed is:

1. A cutlery article comprising a metallic blade, a tang extending from said blade, a plastic handle comprising a recess adapted to receive said tang, and a thermo-plastic cement securing said tang in said recess.

2. A cutlery article comprising a metallic blade, a tang extending from said blade, reinforcing members secured to said tang, a plastic handle comprising a tang receiving recess of greater cross-sectional area than said reinforced tang, and a thermo-plastic cement surrounding and securing said tang in said recess.

3. In the manufacture of cutlery articles, the method of securing a metallic implement to a plastic handle which comprises forming said handle with a recess and securing a part of said implement in said recess by surrounding said part with a thermo-plastic cement.

4. In the manufacture of cutlery articles, the method of joining a metallic implement to a plastic handle which comprises forming said handle with a recess, forming said implement with an extending part adapted to fit loosely in said recess, and filling the spaces in said recess surrounding said part with a thermo-plastic cement.

JOHN B. CURTIS.